Dec. 20, 1966   E. K. DOMBECK   3,292,741
PARKING MECHANISM FOR DUAL BRAKE
Original Filed July 18, 1962   4 Sheets-Sheet 1
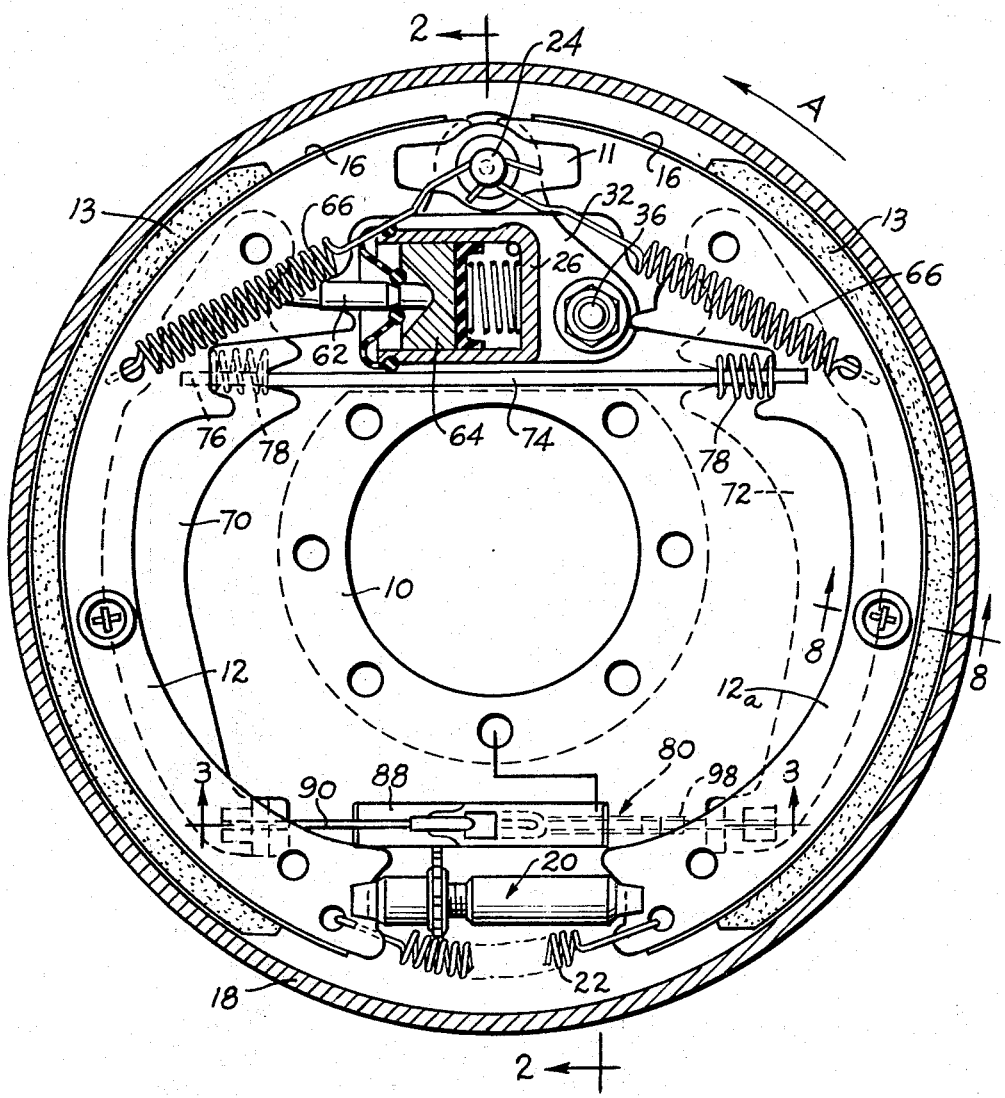
FIG_1
INVENTOR.
EDWARD K. DOMBECK.
BY
Sheldon F. Razer
ATTORNEY.

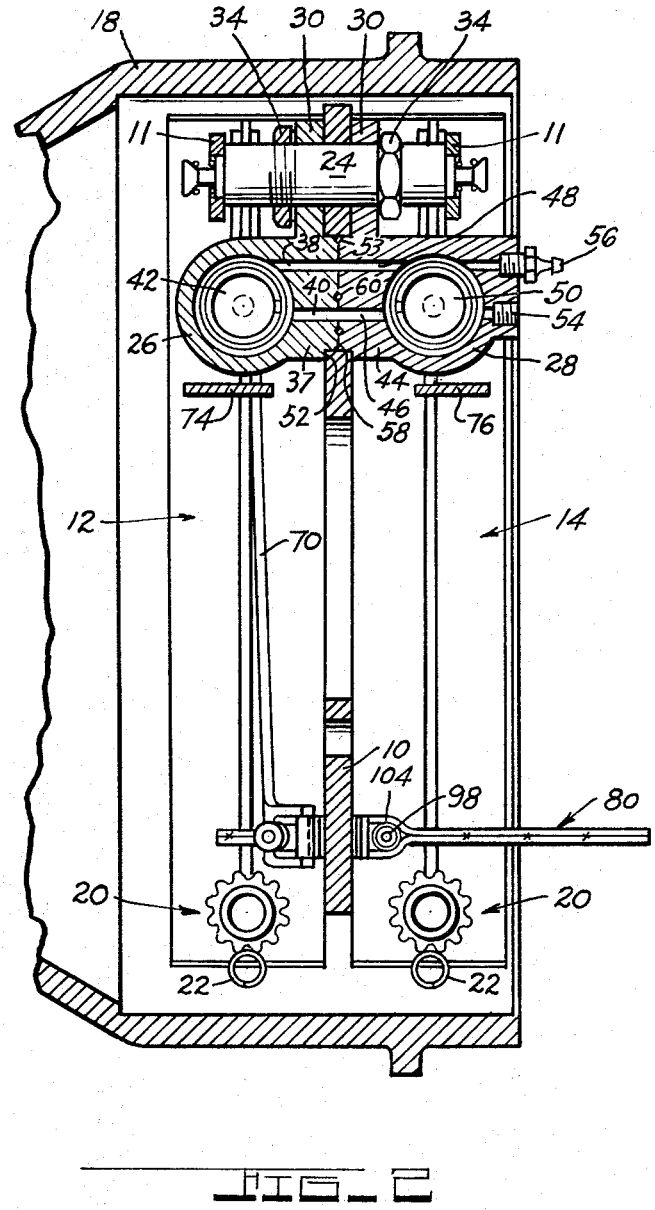

Dec. 20, 1966  E. K. DOMBECK  3,292,741
PARKING MECHANISM FOR DUAL BRAKE
Original Filed July 18, 1962  4 Sheets-Sheet 3
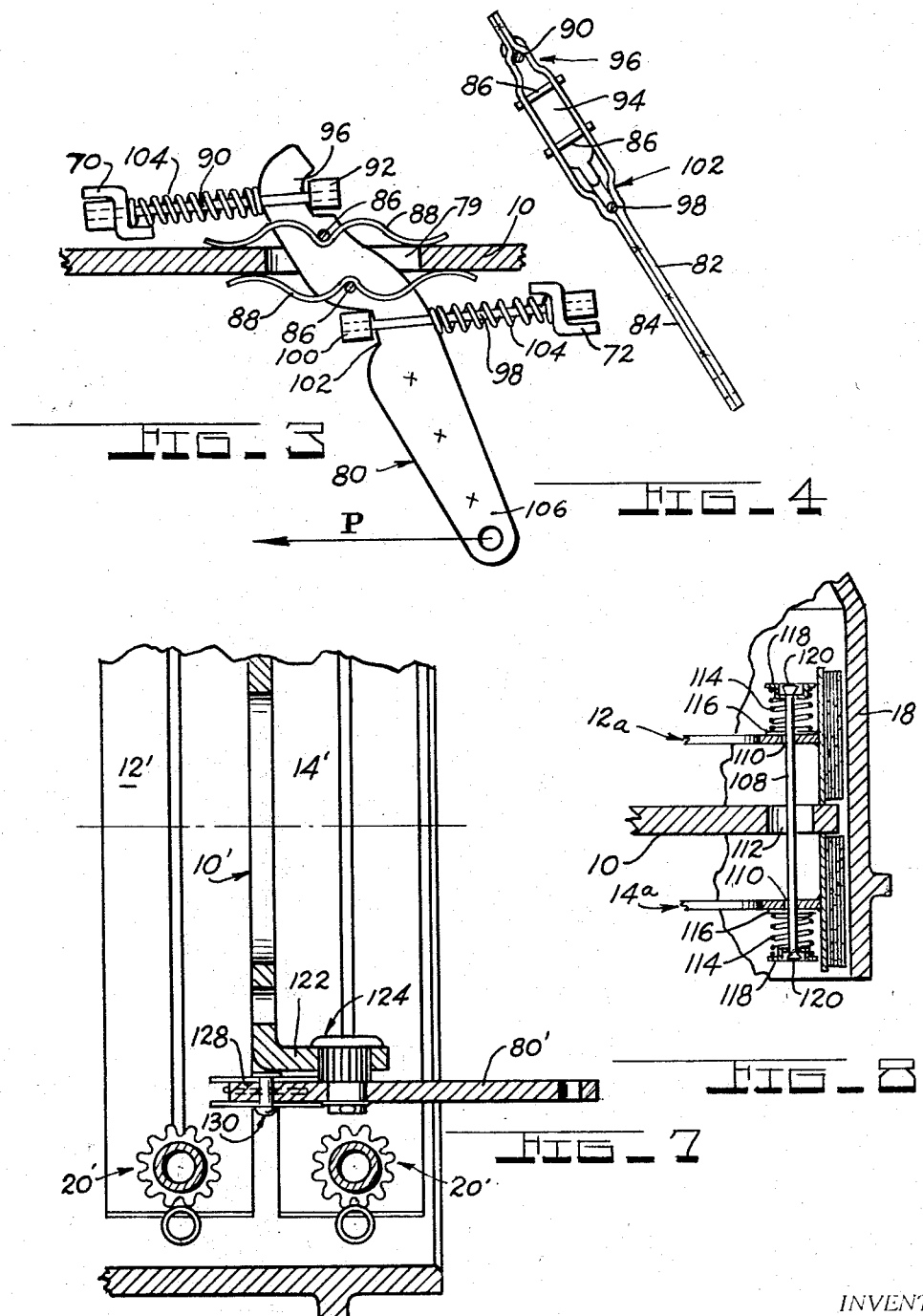
INVENTOR.
EDWARD K. DOMBECK.
BY
*Sheldon F. Rayle*
ATTORNEY.

Dec. 20, 1966     E. K. DOMBECK     3,292,741
PARKING MECHANISM FOR DUAL BRAKE
Original Filed July 18, 1962     4 Sheets-Sheet 4
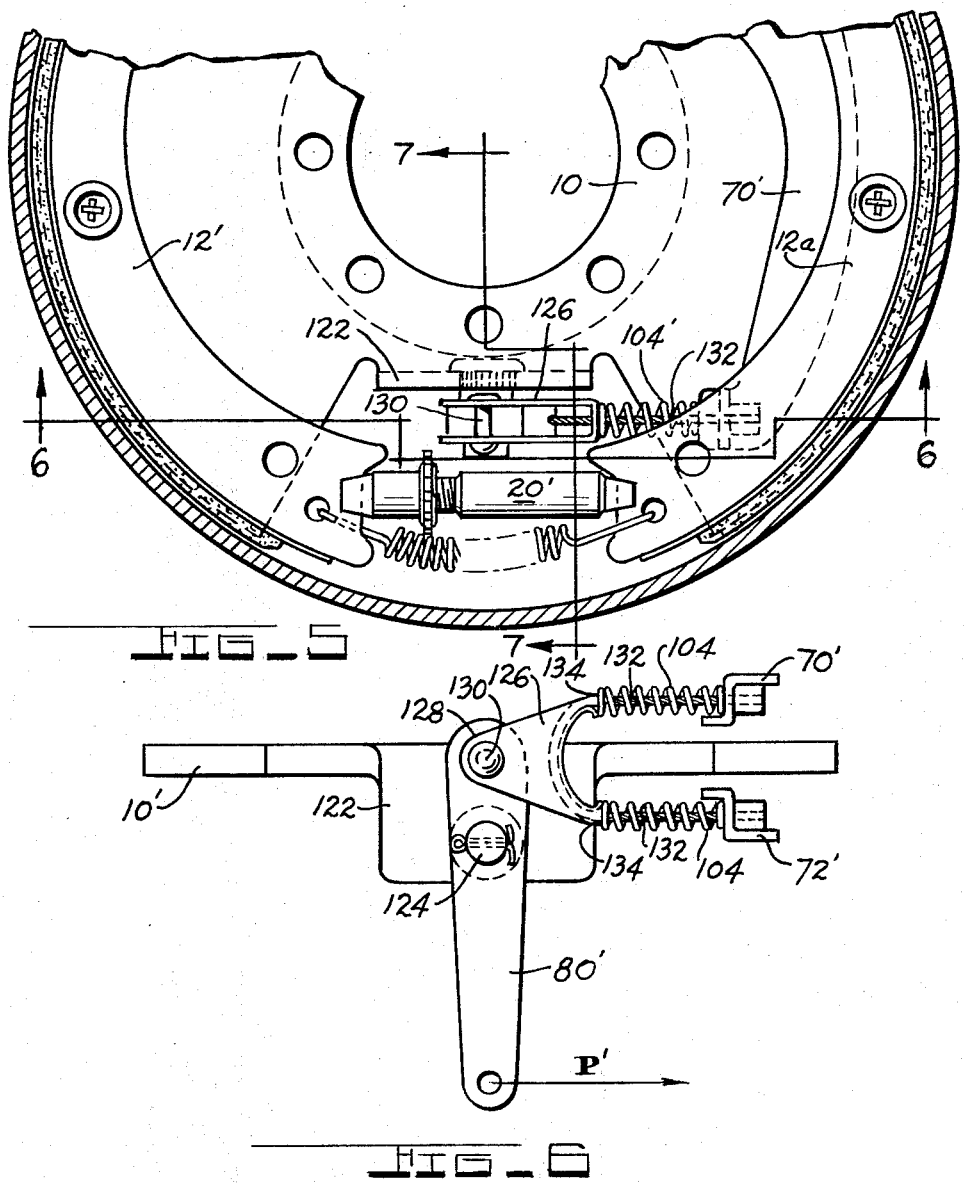
INVENTOR.
EDWARD K. DOMBECK
BY
*Sheldon F. Raizes*
ATTORNEY.

United States Patent Office 3,292,741
Patented Dec. 20, 1966

3,292,741
PARKING MECHANISM FOR DUAL BRAKE
Edward K. Dombeck, South Bend, Ind., assignor to The Bendix Corporation, a corporation of Delaware
Original application Oct. 27, 1964, Ser. No. 406,929. Divided and this application Oct. 1, 1965, Ser. No. 492,124
7 Claims. (Cl. 188—79)

This application is a division of my copending application Serial No. 406,929, filed on October 27, 1964, which in turn is a continuation-in-part of application Serial No. 210, 768 (now abandoned).

This invention relates to a drum brake and more particularly to a drum brake for used on a vehicle having a small wheel base diameter and requiring a large braking force for stopping the vehicle.

One of the objects of this invention is to provide a brake having a set of brake shoes slidably mounted on each side of a backing plate.

An object of the invention is to provide a brake having a set of brake shoes slidably mounted on each side of a backing plate with a manual control for parking brake operation.

A still further object of the invention is to accomplish the above objects with the utilization of as many standard parts as possible.

Other objects and features of the invention will become apparent from a consideration of the following description wherein a selected example embodiment has been chosen to illustrated the invention. The description proceeds with a rerference to the accompanying drawing, wherein:

FIGURE 1 illustrates a front elevational view of a brake assembly of the invention;

FIGURE 2 is a view taken along section line 2—2 of FIGURE 1;

FIGURE 3 is a view taken along section line 3—3 of FIGURE 1;

FIGURE 4 is a side elevational view of an actuating lever utilized for parking brake operation;

FIGURE 5 is a partial front elevation view of a modified embodiment for parking brake operation;

FIGURE 6 is a view taken along section line 6—6 of FIGURE 5;

FIGURE 7 is a view taken along section line 7—7 of FIGURE 5; and

FIGURE 8 is a view taken along section line 8—8 of FIGURE 1 illustrating a shoe hold-down device.

Referring to FIGURES 1 and 2, a backing plate 10 is provided which may be attached to a stationary part of a vehicle, for instance, a spindle (not shown). A pair of T-shaped brake shoes 12, 12a are slidably mounted on one face of the backing plate 10 and a pair of brake shoes 14, 14a (FIGURE 8) are slidably mounted on the other face of the backing plate 10 and are located directly behind the first set of brake shoes. Each brake shoe has a friction lining 13 attached to their rims 16 for frictionally engaging a brake drum 18. An adjustable strut 20 is located between and interconnects one set of adjacent ends of the brake shoes of each set and a spring 22 holds the ends of the brake shoes in engagement with the adjustable strut 20. An anchor pin 24 is secured to the backing plate 10 and located between the other adjacent ends of each pair of brake shoes of each set for anchoring abutment thereof. A retainer plate 11 is provided to laterally locate the ends of each pair of brake shoes with respect to the anchor pin 24.

A wheel cylinder 26 is provided on one side of the backing plate for actuating the set of brake shoes 12, 12a and a wheel cylinder 28 is provided on the other face of the backing plate for actuating the other set of brake shoes 14, 14a. Each wheel cylinder has an ear 30 and flange 32 each having an opening therein. The anchor pin 24 extends through the opening of the ears 30 with the nuts 34 pressing the ears into engagement with a backing plate. A bolt and nut assembly 36 extends through the openings in the flanges 32 for pressing the flanges into engagement with the backing plate thereby resulting in fixing the wheel cylinders to the backing plate. The wheel cylinder 26 has a boss 37 extending therefrom which has an inlet port 38 and an outlet port 40 communicating with the wheel cylinder fluid chamber 42. The wheel cylinder 28 has a boss 44 extending therefrom having an inlet port 46 and an outlet port 48 communicating with the fluid chamber 50. Each boss has a flange 52 for engaging the backing plate surface or faces. The wheel cylinder 28 further has an inlet port 54, communicating with a master cylinder, and a bleeder port 56. The backing plate has an opening 58 into which each boss 36 and 44 extend. The extent to which the bosses may be placed into the opening 58 is limited by engagement of the ear 30 and the flanges 52 on the backing plate faces. The inlet port 38 and outlet port 48 are aligned and the inlet port 46 and the outlet port 40 are aligned. Each boss has aligned annular notches which receive an O-ring 60 for separating the aligned ports 46 and 40 from the other aligned ports 38 and 48, and each boss has a shoulder therein which forms an annular notch when the bosses abut each other for receiving another O-ring 53 which separates the aligned ports from the exterior of the wheel cylinders. Thus, it can be seen that fluid communicated to the inlet nozzle 54 will travel to each fluid chamber 42 and 50 and when it is desired to bleed the wheel cylinder fluid chambers, the fluid will pass through ports 40 and 46 and bleed port 56.

A thrust element 62 of each respective wheel cylinder interconnects a piston 64 with the brake shoe 12 of one set of brake shoes and the brake shoe 14 of the other set of brake shoes. Assuming rotation of the brake drum in the direction of the arrow A, the brake shoes 12 and 14 will be the leading brake shoes and the brake shoes 12a and 14a will be trailing brake shoes. Upon actuation of the wheel cylinders the thrust element 62 will thrust the brake lining 13 of the brake shoes 12 and 14 against the brake drum surface and upon engagement of the friction linings with the brake drum the shoes 12 and 14 will tend to rotate the brake drum thereby transferring their movement to the brake shoes 12a and 14a through the struts 20 effecting engagement of the linings of shoes 12a and 14a with the drum 14. Upon release of the pressure in the wheel cylinders, springs 66 will urge the brake shoes to retracted position. While a wheel cylinder having one piston for spreading only one shoe has been illustrated, obviously an opposed piston wheel cylinder for spreading both shoes of a set may be utilized.

Parking brake

For parking brake operation, a lever 70 is pivotally mounted at one end to the web of the brake shoe 12 and a lever 72 is pivotally mounted at one end to the brake shoe 14a. A strut 74 interconnects the lever 70 with the brake shoe 12a and a strut 76 interconnects the lever 72 with the brake shoe 14. Spring 78 are carried by a portion of each strut for preventing rattling of the strut which is retained within a notce of their respective brake shoes. A slot 79 is provided in the backing plate for receiving a parking brake actuating lever 80 which extends on both sides of the backing plate and is constructed of two stampings 82 and 84 welded together at their ends and spread apart intermediate the ends. Two pins 86 extend between the spread apart portions of the stampings 82 and 84 and are engaged by springs 88 slidably compressed between the backing plate and the pins 86 for holding the lever 80 in position. A cable 90 is attached to the lever 70 and has an abutment 92 which is inserted through the wider opening 94 of the lever 80 and then held in place by the narrower opening and notch 96. A cable 98 is attached to the lever 72 and has an abutment 100 at the end thereof which is inserted through the wider opening 94 of the lever 80 and held in position by the narrower opening and notch 102. Springs 104 are compressed between the lever 70 and lever 80 and between lever 72 and lever 80 for urging the levers 70 and 72 to their retracted position. Upon applying a force P to the end 106 of the lever 80, the lever 80 will fulcrum about the abutment 92 and 100 until the levers 70 and 72 are drawn toward each other to bring the linings of their respective brake shoes into engagement with the drum. Upon release of the lever 80 the springs 66 will urge the brake shoes to their retracted position and the springs 104 will urge the levers 70 and 72 to their respective retracted positions.

Referring to FIGURES 5–7 for the modified embodiment of the lever connection for parking brake operation, similar structure to the previous embodiment is illustrated by like reference numerals with primes attached thereto. The backing plate 10' has a downwardly turned flange 122 and a parking brake lever 80' is pivotally attached to the flange 122 by a bolt 124. A generally U-shaped bracket 126 is rigidly attached to the end 128 of the lever 80' by a rivet 130. The levers 70' and 72' are now axially aligned, one behind the other, and are therefore each on the same side of the lever 80' and both must be pulled in the same direction for spreading the brake shoes. A cable 132 has one end thereof attached to the lever 70' and the other end attached to the lever 72' and has a portion intermediate its ends extending through the U-shaped bracket. The U-shaped bracket has flanges 134 which serve as abutting surfaces for the springs 104' which urge the levers 70' and 72' to their retracted positions. Upon movement of the parking brake lever 80' by the force P' the parking brake lever will move the bracket, thereby moving the levers 70' and 72' for spreading the brake shoes. Obviously separate cables could be used to connect levers 70' and 72' to the bracket 126 rather than a single cable 132.

Referring to FIGURE 8 there is illustrated a brake hold-down device consisting of a pin 108 extending through aligned openings 110 in the webs of brake shoes 12a and 14a and an aligned opening 112 of the backing plate. A spring 114 is compressed between a plate 116 which engages its respective web of a brake shoe and a cup 118 which is held from outward movement by each end 120 of the pin 108. The brake shoes are therefore biased toward each other and into engagement with the backing plate by the brake shoe hold-down device.

The embodiments of the invention have been chosen for purposes of illustration, and it will be understood that they are in no way restrictive of the invention. It is reasonably to be expected that those skilled in the art may make numerous adaptations and revisions of the invention without departing from the spirit and scope of the invention and therefore it is intended that such revisions and variations as incorporate the herein disclosed principles, will be included within the following claims as equivalents thereof.

I claim:
1. A drum brake comprising: a support, a first set of brake shoes arranged in end-to-end relationship and slidably mounted on said support, a second set of brake shoes axially spaced from said first set of brake shoes and arranged in end-to-end relationship and slidably mounted on said support a lever extending through said support and operatively connected to said brake shoes for spreading the same, retaining means fixedly secured to said lever, resilient means operatively connected to said retaining means and slidably engaged with said support to provide a resilient movable support for relative movement between said lever and said support.

2. A drum brake as claimed in claim 1 wherein said retaining means includes first and second spaced apart abutment members fixedly secured to said lever, said resilient means including first and second spring members interposed between said first abutment member and one side of said support and said second abutment member and an opposite side of said support, respectively.

3. A drum brake as claimed in claim 2 wherein said resilient means are readily deformable and removable from said support and said first and second abutment members to permit assembly or disassembly of said lever relative to said support.

4. A drum brake comprising: a support a first set of brake shoes arranged in end-to-end relationship and slidably mounted on said support, a second set of brake shoes arranged in end-to-end relationship and slidably mounted on said support, said first and second sets being axially spaced from each other, a first lever pivotally mounted at one end thereof to the leading brake shoe of said first set, a second lever pivotally connected at one end to the trailing brake shoe of said second set, a first strut interconnecting the trailing shoe of said first set with said first lever, a second strut interconnecting the leading shoe of said second set with said second lever a generally axially extending third lever, a cable connecting the other end of said first lever with said third lever and a second cable connecting the other end of said second lever with said third lever at a point axially spaced from the connection of said first cable with the third lever whereby upon actuation of the third lever in one direction said first and second levers will be drawn toward each other thereby spreading said brake shoes.

5. A drum brake comprising: a backing plate, a set of brake shoes arranged in end-to-end relationship on one face of said backing plate, a first set and a second set of brake shoes arranged in end-to-end relationship on the other face of said backing plate, a first lever pivotally mounted at one end thereof to the leading brake shoe of said first set, a second lever pivotally mounted at one end thereof to the trailing brake shoe of said second set, a first strut connecting said first lever with the trailing brake shoe of said first set, a second strut connecting said lever with the leading brake shoe of said second set, an opening in said backing plate adjacent the other ends of said first and second levers, a third lever extending in a generally axial direction through said opening, a cable connecting the other end of said first lever to said third lever at a point spaced from said backing plate and on the first set side of said backing plate, a second cable connecting the other end of said second lever to said third lever at a point on said third lever spaced from said backing plate and on said second set side of said backing plate whereby upon actuation of said lever in one direction said first and second levers will be drawn toward each other thereby spreading said brake shoes.

6. A drum brake comprising: a support, a first set of brake shoes arranged in end-to-end relationship and slidably mounted on said support, a second set of brake shoes arranged in end-to-end relationship and slidably mounted on said support, said first and second sets being axially spaced from each other and generally axially aligned, a first lever pivotally mounted at one end thereof to one brake shoe of said first set, a second lever pivotally connected at one end to the brake shoe of said second set which is axially aligned with said one brake shoe of said first set, a first strut interconnecting the other shoe of said first set with said first lever, a second strut interconnecting the other shoe of said second set with said second lever, a generally axially extending third lever, cable means operatively connecting the other end of said first lever with said third lever and operatively connecting the other end of said second lever with said third lever at axially spaced locations, whereby upon actuation of the third lever in one direction said first and second levers will be drawn in the same direction thereby spreading said brake shoes.

7. A drum brake comprising: a backing plate, a set of brake shoes arranged in end-to-end relationship on one face of said backing plate, a first set and a second set of brake shoes arranged in end-to-end relationship on the other face of said backing plate, said first and second sets being generally axially aligned, a first lever pivotally mounted at one end thereof to one brake shoe of said first set, a second lever pivotally mounted at one end thereof to the brake shoe of said second set aligned with said one brake shoe of said first set, a first strut connecting said first lever with the other brake shoe of said first set, a second strut connecting said lever with the other brake shoe of said second set, an opening in said backing plate adjacent the other ends of said first and second levers, a third lever extending in a generally axial direction through said opening, cable means operatively connecting the other end of said first lever to said third lever at a point spaced from said backing plate and on the first set side of said backing plate, cable means operatively connecting the other end of said second lever to said third lever at a point on said third lever spaced from said backing plate and on said second set side of said backing plate, whereby upon actuation of said lever in one direction said first and second levers will be drawn in the same direction thereby spreading said brake shoes.

References Cited by the Examiner
UNITED STATES PATENTS

| | | | |
|---|---|---|---|
| 2,202,454 | 5/1940 | Kaufmann | 188—79 |
| 2,263,949 | 11/1941 | Harle | 188—78 |
| 2,645,311 | 7/1953 | Farkas | 188—79 |
| 2,788,091 | 4/1957 | Schjolin et al. | 188—79 |

DUANE A. REGER, *Primary Examiner.*